(12) United States Patent
Reiser

(10) Patent No.: US 9,231,262 B2
(45) Date of Patent: Jan. 5, 2016

(54) MULTI-POINT FUEL CELL VOLTAGE MONITOR

(75) Inventor: Carl A. Reiser, Stonington, CT (US)

(73) Assignee: Audi AG, Ingolstadt (DE)

(*) Notice: Subject to any disclaimer, the term of this patent is extended or adjusted under 35 U.S.C. 154(b) by 976 days.

(21) Appl. No.: 12/735,101

(22) PCT Filed: Dec. 24, 2007

(86) PCT No.: PCT/US2007/026267
§ 371 (c)(1),
(2), (4) Date: Jun. 16, 2010

(87) PCT Pub. No.: WO2009/082374
PCT Pub. Date: Jul. 2, 2009

(65) Prior Publication Data
US 2011/0129749 A1 Jun. 2, 2011

(51) Int. Cl.
*H01M 8/04* (2006.01)

(52) U.S. Cl.
CPC ...... *H01M 8/04552* (2013.01); *H01M 8/04559* (2013.01); *H01M 8/04671* (2013.01); *H01M 8/04679* (2013.01); *H01M 8/0494* (2013.01); *H01M 8/04701* (2013.01); *H01M 8/04753* (2013.01); *H01M 8/04768* (2013.01); *Y02E 60/50* (2013.01)

(58) Field of Classification Search
CPC ............... H01M 8/04552; H01M 8/04559; H01M 8/04671; H01M 8/04679; H01M 8/04753; H01M 8/04768; H01M 8/0494; H01M 8/04701; Y02E 60/50

USPC .......................................................... 429/432
See application file for complete search history.

(56) References Cited

U.S. PATENT DOCUMENTS

| | | | |
|---|---|---|---|
| 5,170,124 A | 12/1992 | Blair et al. ..................... 324/434 |
| 5,763,113 A | 6/1998 | Meltzer et al. .................. 429/13 |
| 6,339,313 B1 | 1/2002 | Adams et al. | |
| 6,410,176 B1 | 6/2002 | Genc et al. ...................... 429/13 |
| 6,646,418 B1 | 11/2003 | Xie et al. ....................... 320/120 |
| 6,724,194 B1 | 4/2004 | Barton .......................... 324/432 |
| 2004/0137292 A1 | 7/2004 | Takebe et al. ................... 429/23 |
| 2005/0106443 A1* | 5/2005 | Adams et al. ................... 429/34 |
| 2008/0042654 A1* | 2/2008 | Kato ............................ 324/425 |

FOREIGN PATENT DOCUMENTS

| | | |
|---|---|---|
| JP | 11-273702 | 10/1999 |
| KR | 10-0749259 | 8/2007 |

* cited by examiner

*Primary Examiner* — Gary Harris
(74) *Attorney, Agent, or Firm* — Seed IP Law Group PLLC

(57) ABSTRACT

A fuel cell voltage monitor (12a, 12b, 40, 140, 440) detects and may respond to, a problematic operating condition at or near a fuel cell (10) or within a subset (n) of fuel cells, as in a fuel cell stack assembly (110). Two or more co-planar, spaced voltage leads or contacts in a fuel cell plane, as at a separator plate, detect the presence of a voltage difference within the plate/plane as an indication of an operating problem at or near the fuel cell. Placement of such arrangements of at least two spaced voltage leads at various subset intervals (n), of fuel cells in a stack assembly allow monitoring for such problems throughout the stack assembly, either by analysis of voltage difference between co-planar leads at respective individual fuel cells or by comparison of voltage differences between aligned pairs of voltage leads at opposite ends of a subset.

14 Claims, 3 Drawing Sheets

MULTI-POINT FUEL CELL VOLTAGE MONITOR

TECHNICAL FIELD

This disclosure relates to fuel cells and more particularly to monitors for fuel cells. More particularly still, the disclosure relates to a fuel cell voltage monitoring arrangement.

BACKGROUND ART

Fuel cells provide clean, direct current electricity by converting reactants, namely fuel (typically hydrogen) and oxidant (air or oxygen), to generate electric power and reaction products. Fuel cells generally employ an electrolyte disposed between two electrodes, namely a cathode and an anode. A catalyst typically induces the desired chemical reactions. The catalysts are typically located at the interfaces between each electrode and the adjacent electrolyte.

Fuel cells having various types of electrolytes are within the scope of consideration. Some fuel cells have solid polymer and solid oxide electrolytes, whereas others employ liquid electrolytes, etc. Fuel cell assemblies require separator plates for providing current passage and separating the fuel and oxidant reactant gases between the cells. They are disposed on each side of the electrode/electrolyte assembly of the individual fuel cell.

During operation, the output voltage of an individual fuel cell under load is generally less than one volt (e.g., 0.6-0.9 volts. Thus, in order to provide greater output voltage, it is usually necessary to stack numerous cells together and connect electrically in series to create a higher voltage fuel cell stack. Fuel cell stacks can then be further connected in series and/or parallel to form larger arrays for delivering higher voltages and/or currents.

It is conventional practice to sense or monitor the voltage of various ones, or even all, of the fuel cells in a fuel cell stack assembly in order to monitor the health, i.e., performance and/or endurance capacity, of the stack assembly as a whole, or even sub-groups or individual fuel cells within the stack assembly. Examples of such voltage monitoring arrangements are disclosed in U.S. Pat. Nos. 5,170,124; 5,763,113; 6,646,418; and 6,724,194, in which voltages sensed at individual ones of the fuel cells in a stack assembly are collectively analyzed by appropriate processing circuitry.

To provide a voltage signal associated with a particular fuel cell in the stack assembly, a voltage contact, lead, or pin, herein after typically a "lead" or "contact", is in contact with the particular fuel cell at a discrete location therein or thereon, and acts as a sensor for that particular fuel cell. While the voltage lead of the sensor may be in contact with any of several locations in a typical fuel cell, one typical location is contact with the conductive, bipolar plate used to separate adjacent fuel cells. These separating plates may variously be identified as flow field plates, separator plates, water transfer plates, or the like, and the voltage lead is typically located at or near the corner of a generally rectangular-shaped fuel cell/separator plate. A single such lead typically serves to sense the voltage and provide the associated voltage signal for that particular cell.

While the afore-described arrangements of voltage sensors associated with fuel cells in a fuel cell stack assembly are able to reveal significant information regarding the condition of the cells and assembly, there are debilitating operating modes that these arrangements of sensors do not detect. Perhaps the most common of these debilitating modes is that of local fuel starvation. This condition may destroy cathode catalyst; but only in a very local area. A typical voltage monitor having a voltage lead at one corner of a fuel cell simply can not differentiate between this type of decay caused by local fuel starvation, which may be of sudden onset, and the more normal, gradual, and thus manageable decay caused by catalyst recrystallization, carbon corrosion and/or reversible catalyst layer wetting.

What is needed is an arrangement for the effective detection of local problems in the stack at the level of the individual fuel cell. An arrangement for the detection of local fuel starvation would be of particular benefit.

SUMMARY

The present disclosure recites a fuel cell voltage monitoring arrangement, or scheme, for the effective detection of local problems in an individual fuel cell, and particularly such problems in a fuel cell stack assembly at the level of the individual fuel cell, or a subset of fuel cells in the stack assembly. More specifically, the present disclosure recognizes that any problem of local character in a stack assembly, herein after a "local stack problem", results in a shift of current flow around the problem area and moreover, that such shift inevitably results in an in-plane current flow in the separator plate. Still further, the disclosure recognizes that any in-plane current flow will result in a voltage difference in the plate (and plane). Apparatus and methods are disclosed herein for the utilization of this characteristic.

Accordingly, the present disclosure provides two or more spaced voltage leads or contacts in a fuel cell plane, as at a separator plate, to detect the presence of a voltage difference within the plate/plane. Such a detected voltage difference is thereby indicative of a local stack problem, as at that particular fuel cell or in the immediate region thereof. Moreover, such arrangements of two or more voltage contacts located in a plane may, in one extreme, be applied to each and every fuel cell in a stack assembly. Alternatively, and more likely and economical in the instance of large stacks, the two or more voltage contacts per fuel cell may be located at intervals "n" of fuel cells in the stack as, for example, at intervals of every 10, or even every 50, cells. More generally, the two or more voltage contacts or leads per cell may be at intervals of $n_1$, $n_2$, $n_3$, ... $n_x$, where each interval might be equal or different. In the instance of two in-plane voltage contacts associated with a particular fuel cell, they will preferably be spaced relatively distantly from each other in the plane of contact, as at two adjacent or at two diagonally opposite, corners of a rectilinearly-shaped fuel cell.

As an alternative to monitoring for voltage differentials across respective selected ones of the fuel cells in a fuel cell stack assembly to detect problems local to the respective selected cell, such a local problem is detectable in a "regional" manner. A subset of multiple adjacent fuel cells in the stack assembly is provided with at least two voltage contacts or leads at each of the two fuel cells at the opposite ends of the subset. Each lead of those at least two leads per fuel cell is spaced at the respective fuel cell as described above. However, a first voltage difference is measured between the pair of leads at a same first location on respective fuel cells at opposite ends of the stack subset, a second voltage difference is measured between the pair of leads at a same second location on respective fuel cells at opposite ends of the same stack subset, and the first and second voltage differences are compared such that a further difference, if any, is an indication of a local problem in, or partly in, that stack subset.

Each and all of the foregoing arrangements is thus able to provide a signal indicative of the operating condition of the fuel cell and/or stack assembly, which signal is then available to a power plant controller to effect appropriate response to the condition.

The foregoing features and advantages of the present disclosure will become more apparent in light of the following detailed description of exemplary embodiments thereof as illustrated in the accompanying drawings.

DETAILED DESCRIPTION

Figure 1:
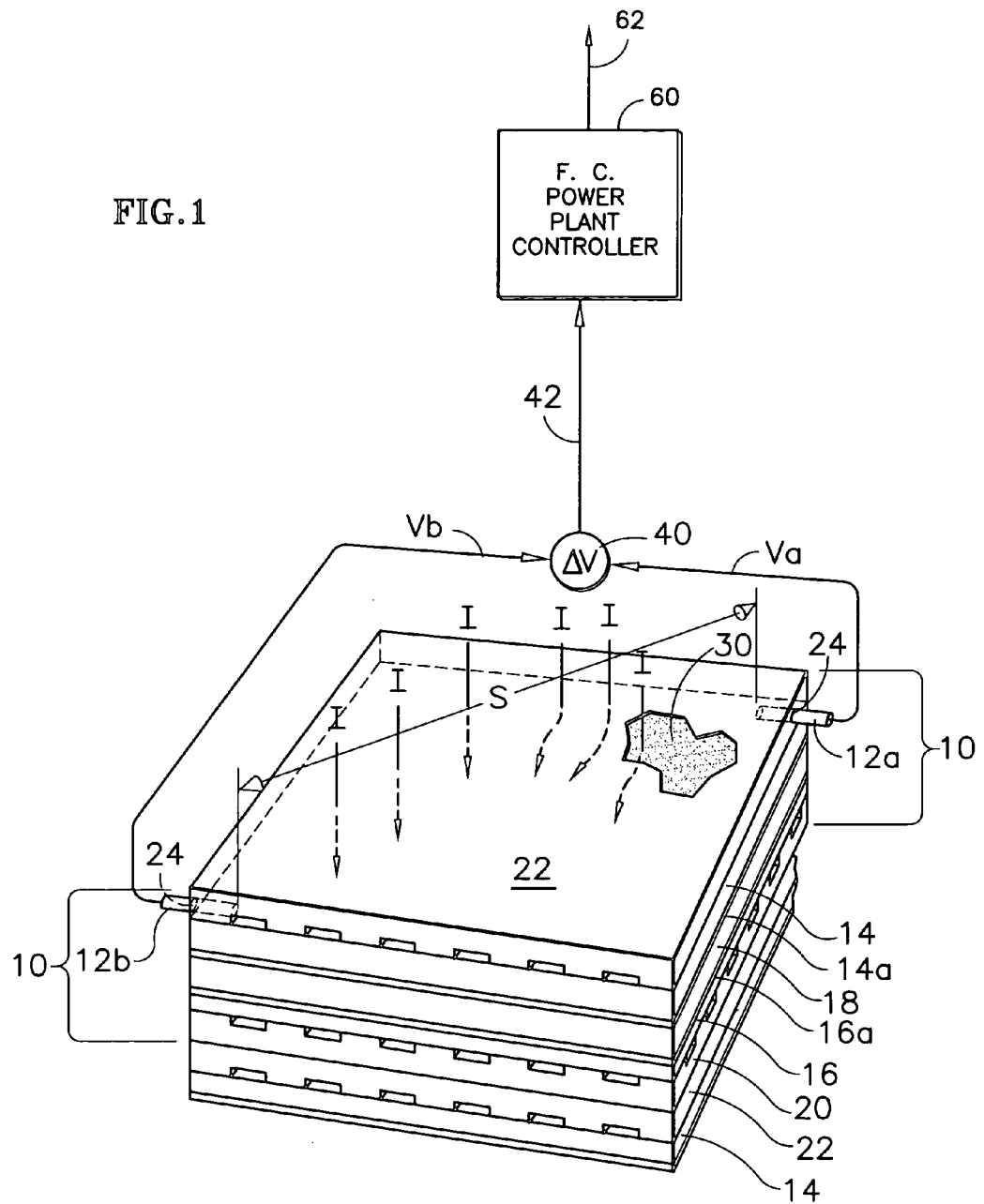
FIG. 1 is a perspective view of a fuel cell illustrating the inclusion and spaced location of at least 2 voltage sensing leads in a plane of that fuel cell.

Referring to FIG. 1, there is illustrated a perspective view of a generalized configuration of a fuel cell 10 showing the inclusion of at least 2 voltage sensing leads 12a and 12b positioned in spaced relation "S" in a plane of that fuel cell. The fuel cell 10 is typically comprised of an anode substrate 14 having an anode catalyst 14a on a face thereof, a cathode substrate 16 having a cathode catalyst 16a on a face thereof, an electrolyte layer 18 intermediate and contacting the catalyst-coated surfaces 14a and 16a of the anode 14 and cathode 16; a cathode separator plate 20 adjacent the outer surface of the cathode 16, and an anode separator plate 22 adjacent the outer surface of the anode 14. For the purposes of the present discussion, each of the aforementioned elements or regions of, or within, a fuel cell, to wit, the separator plates 20 and 22, the anode 14, the cathode 16 and the electrolyte (or electrolyte region) 18, are described as being nominally or generally planar in shape and are arranged in layered assembly. A further anode separator plate 22 and anode substrate 14 are illustrated to indicate the manner in which a next-adjacent fuel cell would be positioned if arrayed in a stack assembly, as is typically the case.

Solely for purposes of discussion herein, the electrolyte 18 will be presumed to be of the solid polymer membrane type, as in a PEM cell. However, it will be appreciated that the electrolyte might be any of the other various forms, such as phosphoric acid, molten carbonate, etc. and remain within the scope of the disclosure. Moreover, the separator plates 20 and 22 may take a variety of forms, and are typically conductive, bipolar structures that engage the cathode 16 and anode 14, respectively, and typically have grooves or channels to provide flow fields for the fuel, typically $H_2$, and the oxidant, typically air, as well as to transfer product water through a porous structure. Moreover, the separator plates 20 and 22 serve to define the structural limits of an individual fuel cell 10 and to space it from the next adjacent fuel cell in a stack assembly, as well as to provide electrical conductivity and connection there between. It will be understood that although the anode and cathode separator plates are shown and described here as separate elements or plates, they may in fact be combined as a single structure when located intermediate a pair of adjacent fuel cells in a stack assembly.

Each of the at least two voltage-sensing contacts, or leads, 12a and 12b, may be of a variety of known configurations and electrical contacting arrangements with a coplanar portion of the fuel cell 10. As shown herein, it is convenient for each of the voltage leads 12a and 12b to be metal conductors, perhaps of noble metals, that are positioned in good physical and electrical contact with the interface between the anode separator plate 22 and the anode 14, as by an interference fit within a groove or channel 24 provided in the mating face of the separator plate 22 and/or anode 14. Importantly, the contacts 12a and 12b are spaced from one another across the surface of the mating face of the separator plate 22 by a distance "S" illustrated on FIG. 1. The plan profile of the fuel cell 10, and particularly its constituent elements, is generally rectilinear, and typically rectangular. Accordingly, the contacts 12a and 12b are typically located at or near two opposite corners of the separator plate 22, though positioning at or near two adjacent corners may also be suitable, particularly if or as the rectangular shape approaches that of a square.

Maximizing the distance between the two contacts 12a and 12b within a plane of the fuel cell 10 generally increases the opportunity to sense any voltage difference arising in the plane as the result of in-plane current flow caused by local problems such as local fuel starvation. Referring to FIG. 1, a region designated 30 is shaded to represent a region of fuel starvation at least in the area of the interface between the separator plate 22 and the anode 14, though the effects may tend to extend through the fuel cell 10 for some limited distance in the direction of the next adjacent fuel cells to either side of it in a stack assembly. Whereas the normal flow of current is as depicted by arrows "I" toward the left side of FIG. 1, the presence of that local region 30 of fuel starvation results in a shift of current flow in the problem area as depicted by the curved arrows "I" near the region 30. This current flow shift necessarily results in an in-plane current flow in that region, i.e., the separator plate 22, which in turn results in a voltage difference in the general plane of that plate 22. Thus, the utilization of two or more voltage sensors 12a, 12b, etc. generally in that plane and spaced from one another will detect that voltage difference, which is in turn indicative of the existence, and to some extent the magnitude, of the local problem.

Each of the contacts 12a and 12b is conductively connected, via lines Va and Vb respectively, to apply the respective sensed voltages to some form of suitable comparative circuitry, as for example comparator 40. The comparator 40 provides a signal or indication 42 of the existence, and perhaps magnitude, of a voltage difference, which is in turn indicative of a local problem in the fuel cell 10 in which the contacts reside. The signal 42 is, or may be, conveniently extended to a fuel cell power plant controller 60 to provide one or more output control signals 62 for controlling operation of the fuel cells 10 comprising a stack assembly of a power plant.

Figure 2:
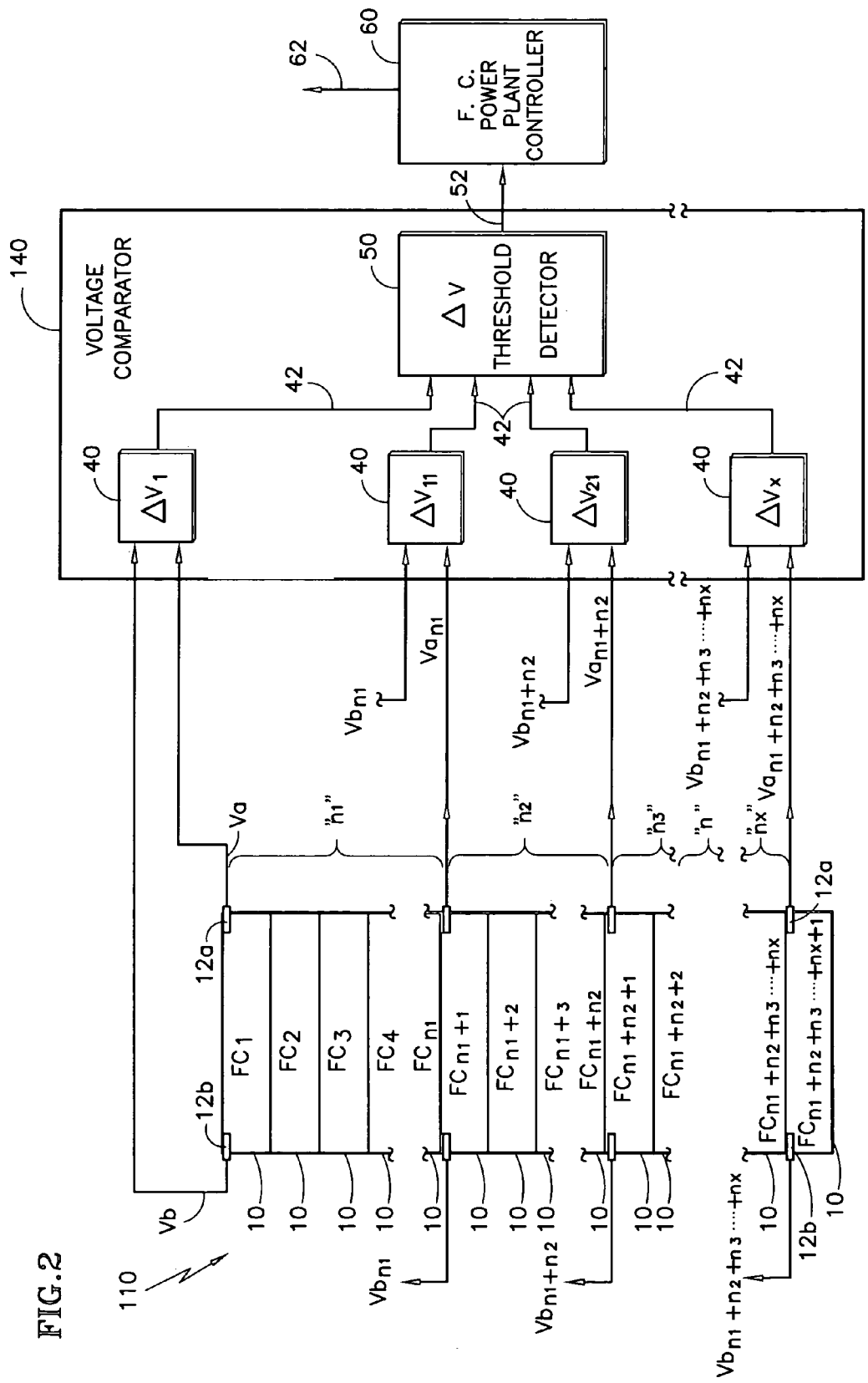
FIG. 2 illustrates a schematic block diagram of a fuel cell stack assembly having voltage sensing leads and associated circuitry for detecting "local" problems in accordance with one aspect of the disclosure.

Referring now to FIG. 2, there is illustrated a schematic block diagram in accordance with one aspect of the disclosure, of a fuel cell stack assembly 110 comprised of a number of fuel cells 10 cascaded in serial electrical and physical configuration to provide a requisite voltage. A typical fuel cell stack assembly 110 might range from fewer than 50 cells to 250 cells or more. While in the extreme it is theoretically possible to locate pairs of voltage contacts at each fuel cell in the stack, the cost and bulk would likely be prohibitive. Instead, significant information on the health of the stack may be obtained firstly by placing individual voltage contacts (not separately shown) at various intervals along the stack as known from the prior art, but also importantly in accordance with the present disclosure, pairs (or more) of voltage contacts may also be placed at various intervals preferably also utilizing some of the individual voltage contacts as one contact of the contact pair. The stack assembly 110 is illustrated as having pairs of substantially co-planar voltage contacts, as individually illustrated in FIG. 1, at various intervals, generally designated "n", along the stack, with the $1^{st}$ interval being designated "$n_1$", the second interval being designated "$n_2$", the third interval being designated "$n_3$" and so forth through the last interval that is designated "$n_x$", where "n" is some integer number and, from interval to interval, may differ or be the same as one or more or each of the others. Perhaps the most typical arrangement is for "n" to be a constant of perhaps ten or twenty or even fifty. Assuming the latter, one might have a stack assembly 110 of 250 fuel cells, with individual voltage contacts (not shown) installed at every tenth cell, but with a pair of contacts 12a and 12b installed at each $50^{th}$ cell, and one contact of that pair being the otherwise individual contact appearing at that location.

As described previously with respect to FIG. 1, the voltage signals Va and Vb from a respective pair of voltage contacts 12a and 12b are extended to appropriate comparison circuitry determining whether or not a voltage differential exists between that pair of contacts and perhaps also the magnitude of any such difference.

Referring again to FIG. 2, each pair of voltage contacts 12a and 12b provides voltage signals via respective pairs of lines $Va_1$, $Vb_1$; $Va_{n1}$, $Vb_{n1}$; $Va_{n1+n2}$, $Vb_{n1+n2}$; through $Va_{n1+n2+n3\ldots+nx}$, $Vb_{n1+n2+n3\ldots+nx}$, to appropriate comparator circuitry 140. The voltage comparator circuitry 140 is here shown as comprised of representative separate comparators 40, for providing representative signals or indications 42 of the existence and perhaps magnitude of a voltage difference sensed by the respective contact pair; however it will be appreciated that such comparisons may be made by singular circuitry operating to scan the respective pairs of lines in sequence. The various representative voltage differential signals 42 from the various comparators 40 may then be extended to provide respective representative inputs to a voltage differential threshold detector 50 for the purpose of providing an output alarm or signal 52 only if and when a voltage differential of some threshold magnitude is present. Alternatively, of course, such threshold could be incorporated in each comparator circuit 40. Still further, it will be understood and appreciated that although the analytical voltage comparator 140 has been illustrated as being comprised of discrete circuits 40 and 50, perhaps the most practical implementation is through the use of a suitably programmed digital processor or analyzer in which the voltages on lines $Va_1$, $Vb_1$, etc., are converted to digital values and perhaps then provided as multiplexed inputs to the processor for sequential comparative analysis as various pairs to eventually provide essentially the same information.

Indeed, in keeping with this latter characterization, the output signal 52 of the voltage differential threshold detector 50 serves as an input to a/the fuel cell power plant controller 60, which in turn provides one or more output control signals 62 for controlling operation of the fuel cell stack assembly 110 via various controlled operating components and systems (not shown). For instance, one or more operating parameters may be controlled, such as reactant flow rates, coolant flows, fuel cell temperatures, stack assembly power output, etc. Still further, the threshold detector and/or the power plant controller 60 of which it may be a part, may recognize not only a satisfactory operating state in which operation continues as usual, or an extreme problem status in which it is prudent or necessary to shutdown operation of the stack assembly, but also an intermediate operating state in which a moderate operating problem is determined and operation is allowed to continue with some modulation and/or modification of one or more operating parameters in an effort to return to normal operation.

With the above-described arrangement for detecting voltage gradients across the plane of an element, or elements, in an individual fuel cell, it is then possible and reasonable to conclude that a local problem at that cell and/or nearby cells, such as fuel starvation, exists. Once identifying the existence and perhaps magnitude of such problem, it is then possible to terminate operation and/or take appropriate corrective or remedial action. The intervals within the stack between voltage contact pairs will determine both the preciseness with which such problems can be both detected and located, and also the cost of achieving such preciseness. It is also appropriate to note that although the present description addresses the use of two (a pair of) substantially co-planar voltage contacts at an individual fuel cell to identify local problems, the use of 3 or even 4 such co-planar contacts would perhaps further increase detection accuracy but is generally less preferred because of a disproportionate increase in cost.

Figure 3:
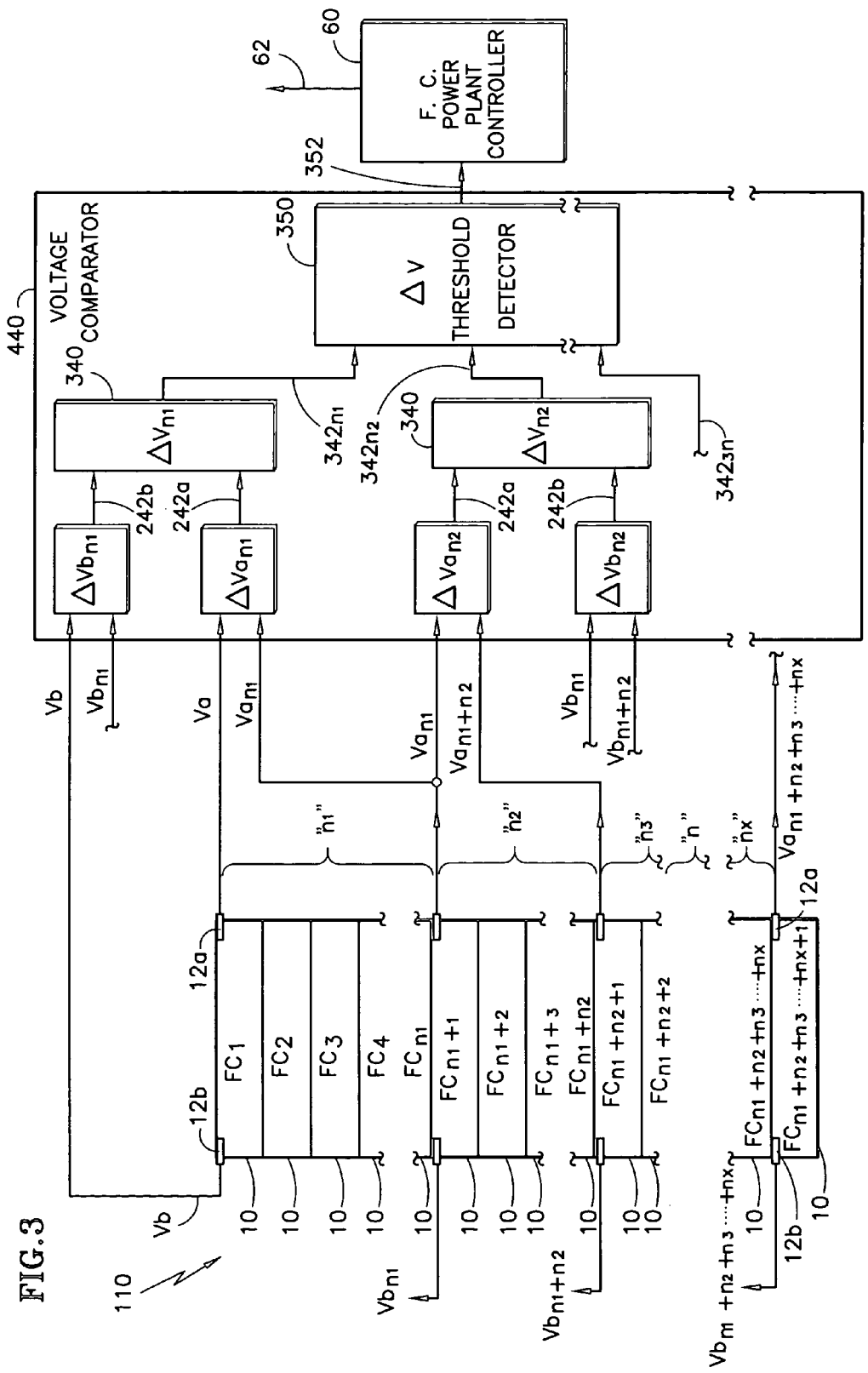
FIG. 3 illustrates a schematic block diagram of a fuel cell stack assembly having voltage sensing leads and associated circuitry for detecting "local" problems in accordance with another aspect of the disclosure.

In an alternative arrangement for detecting a problem of local nature in a fuel cell stack assembly, reference is made to FIG. 3 which is similar in many respects to that of FIG. 2, but which also differs in a significant manner. Specifically, the fuel cell stack assembly 110 is, or may be, substantially the same as described with respect to FIG. 2, including the placement of pairs (or more) of co-planar voltage contacts 12a and 12b at various intervals "n" within the stack assembly 110. However, whereas previously the focus was on detecting a voltage differential, if any, across the plane of an individual fuel cell, that focus now is upon detecting voltage anomalies associated with a subset, or series of subsets, of fuel cells within the stack assembly. This is done by the use of a pair of co-planar leads (contacts) at one end of the stack assembly subset in combination with a pair of co-planar leads at the other end of the subset. For the sake of convenience and brevity of description and depiction herein, the stack assembly fuel cell subsets of FIG. 3 comport exactly with the intervals "n" depicted and described as $n_1$, $n_2$, $n_3 \ldots n_x$ with respect to FIG. 2.

In this instance, however, the respective voltages $V_a$ and $Va_{n1}$ at the two (i.e., pair of) leads 12a that occupy the same position in the planes of the respective cells $FC_1$ and $FC_{n1+1}$ at the opposite ends of the stack subset $n_1$ are extended to a voltage comparator $\Delta Va_{n1}$ comprising part of an analytical voltage comparator 140 to quantify the voltage (normally not zero) there between as output 242a. Similarly, the respective voltages Vb and $Vb_{n1}$ at the two i.e., pair of) leads 12b that occupy the same position, i.e., the "b" position, across the respective cells in the planes of the respective cells $FC_1$ and $FC_{n1+1}$ at the opposite ends of the stack subset $n_1$ are extended to a voltage comparator $\Delta Vb_{n1}$ to quantify the voltage (normally not zero) there between as another output 242b. Then, importantly, the $\Delta Va_{n1}$ and the $\Delta Vb_{n1}$ voltage signals 242a and 242b, respectively, are compared at comparator $\Delta V_{n1}$ to provide output $342_{n1}$ as the difference, if any, between the stack subset voltage difference for the "a position" vs the stack subset voltage difference for the "b position". In a normal condition, the voltage difference for the "a" position and for the "b" position for the stack assembly subset should be nominally the same, even though each might be on the order of many volts, depending upon the number of fuel cells in the subset. However, if there is a local problem within the stack subset as a region, it will tend to manifest itself by making the "a" position voltage difference greater than for the "b" position, or vice versa, and the compared output $342_{n1}$ will reflect this.

Accordingly, if an output $342_{n1}$, or $342_{n2}$, etc, exceeds some non-zero threshold, it may be taken as an indication of a local problem in that subset. Thus, those outputs $342_{n1}$, or $342_{n2}$, etc., are extended to a $\Delta V$ threshold detector 350 to provide an output signal or alarm 352 if one or more of the subsets indicates a voltage difference sufficient to be of concern. As with FIG. 2, voltage comparator circuitry 440 is depicted as being comprised of discrete circuit elements 240, 340, 350, etc, but it will be understood that it may well take the form of an integral digital processor or analyzer. The output signal 352 of the $\Delta V$ threshold detector 350 is depicted as serving as an input to a/the fuel cell power plant controller 60, which in turn provides one or more output control signals 62 for controlling operation of the fuel cell stack assembly 110 via various controlled operating components and systems (not shown). In this regard, the functions and circuitry of the voltage comparator circuitry 440 may be part of a digital processor which also constitutes the fuel cell power plant controller 60.

Although the disclosure has been described and illustrated with respect to the exemplary embodiments thereof, it should be understood by those skilled in the art that the foregoing and various other changes, omissions and additions may be made without departing from the spirit and scope of the invention.

What is claimed is:

1. A fuel cell voltage monitor (12a, 12b, 40, 140), comprising:
    a rectilinearly-shaped fuel cell (10) having a plurality of elements stacked in layered arrangement, said elements including an anode (14, 14a), a cathode (16, 16a), an electrolyte (18), and anode and cathode plates (22, 20), the anode (14, 14a) and cathode (16, 16a) being on opposite sides of the electrolyte (18) and between the respective plates (22, 20);
    first and second voltage leads (12a, 12b) in electrical contact with a same one (22, 14) of said elements and positioned in spaced apart (S) relation at diagonally opposite corners on the element to sense the respective voltages; and
    voltage comparing circuitry (40, 140) coupled to the first and second voltage leads (12a, 12b) to compare the respective voltages and provide a signal (42) indicative of a difference in said respective voltages, said voltage difference associated with in-plane current flow related to an operating problem in the fuel cell (10).

2. The fuel cell voltage monitor (12a, 12b, 40, 140) of claim 1 wherein said anode and cathode plates (22, 20) are separator plates, and the first and second voltage leads (12a, 12b) are in electrical and physical contact with one of said anode and cathode separator plates (22, 20).

3. The fuel cell voltage monitor (12a, 12b, 40, 140) of claim 2 wherein the first and second voltage leads (12a, 12b) are in electrical and physical contact with the anode separator plate (22).

4. A system, comprising:
    a rectilinearly-shaped fuel cell, including:
        an anode;
        a cathode;
        an electrolyte between the anode and the cathode;
        an anode plate; and
        a cathode plate, the anode and cathode being between the anode plate and the cathode plate, at least one of the cathode plate and the anode plate including a first lead and a second lead diagonally spaced from each other at opposite corners;
    a comparator coupled to the first and second leads to compare voltages detected from the first and second leads.

5. The system of claim 4 wherein the first and second leads are electrically and physically in contact with the cathode plate.

6. The system of claim 4 wherein the first and second leads are electrically and physically in contact with the anode plate.

7. A device, comprising:
    a fuel cell that includes a plurality of stacked elements, each of the elements being rectilinearly-shaped, the plurality of stacked elements including an anode, a cathode, an electrolyte, an anode plate, and a cathode plate; and
    a voltage monitor coupled to a first lead extending from a first one of the elements and coupled to a second lead extending from the first one of the elements, the first lead and the second lead being positioned at diagonally opposite corners of the first one of the elements.

8. The device of claim 7 wherein the voltage monitor is coupled to a third lead extending from a second one of the elements and coupled to a fourth lead extending from the second one of the elements, the third lead and the fourth lead being positioned at diagonally opposite corners of the second one of the elements.

9. The device of claim 7 wherein the voltage monitor includes a first comparator coupled to the first and second leads and a second comparator coupled to the third and fourth leads.

10. The device of claim 7 wherein the first and second comparators are coupled to a threshold detector.

11. The device of claim 7 wherein the first and second leads are electrically and physically in contact with the anode plate.

12. A system, comprising:
    a fuel cell including a plurality of elements, the plurality of elements including an anode, a cathode, an electrolyte between the anode and the cathode, an anode plate, and a cathode plate, the anode and cathode being between the anode plate and the cathode plate, a first one of the elements being rectilinearly-shaped and having a first corner that is diagonally spaced from a second corner, a first lead coupled to the first corner and a second lead coupled to the second corner; and
    a voltage monitor coupled to the first and second leads to compare voltages detected from the first and second leads.

13. The system of claim 12 wherein a second one of the elements is rectilinearly-shaped and has a third corner that is diagonally spaced from a fourth corner, a third lead coupled to the third corner and a fourth lead coupled to the fourth corner.

14. The system of claim 13 wherein the voltage monitor includes a first comparator coupled to the first and second leads and a second comparator coupled to the third and fourth leads.

* * * * *